US009184817B2

(12) United States Patent
Wu et al.

(10) Patent No.: US 9,184,817 B2
(45) Date of Patent: Nov. 10, 2015

(54) METHOD OF GENERATING CODEBOOK OF UNIFORM CIRCULAR ARRAY AND ACQUIRING CODEWORD FROM THE CODEBOOK

(75) Inventors: Lu Wu, Shanghai (CN); Hongwei Yang, Shanghai (CN); Di Lv, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/115,183

(22) PCT Filed: Apr. 27, 2012

(86) PCT No.: PCT/IB2012/001187
§ 371 (c)(1),
(2), (4) Date: Nov. 1, 2013

(87) PCT Pub. No.: WO2012/150505
PCT Pub. Date: Nov. 8, 2012

(65) Prior Publication Data
US 2014/0064401 A1    Mar. 6, 2014

(30) Foreign Application Priority Data
May 3, 2011   (CN) .......................... 2011 1 0114279

(51) Int. Cl.
*H04B 7/04* (2006.01)
(52) U.S. Cl.
CPC ............ *H04B 7/0469* (2013.01); *H04B 7/0486* (2013.01); *H04B 7/0465* (2013.01); *H04B 7/0478* (2013.01)
(58) Field of Classification Search
CPC .. H04B 7/0639; H04B 7/0478; H04B 7/0465; H04B 7/0456; H04B 7/0413; H04B 7/0486; H04B 7/0469

USPC .................. 375/267, 296, 295, 260, 259, 261
See application file for complete search history.

(56) References Cited

U.S. PATENT DOCUMENTS 8,111,655 B2 *  2/2012  Hui ................................ 370/329
8,548,095 B2 * 10/2013  Park et al. ..................... 375/299

(Continued)

FOREIGN PATENT DOCUMENTS

EP     2 224 607 A2    9/2010
JP     2006-005908     1/2006

(Continued)

OTHER PUBLICATIONS

International Search Report for PCT/IB2012/001187 dated Oct. 4, 2012.

(Continued)

*Primary Examiner* — Kenneth Lam
(74) *Attorney, Agent, or Firm* — Fay Sharpe LLP (57) ABSTRACT

The present invention proposes a technical solution of codebook design which is suitable for antennas configured in a uniform circular array. Respective codewords in the designed codebooks have constant modulus, respective columns being orthogonal to each other and nested property. Based on the designed codebook, the invention further provides a method of determining a codeword in a base station of a MIMO communication system, the base station being configured with $N_t$ antennas in a uniform circular array, wherein the method comprises the steps of receiving codeword index information from a user equipment; and determining a target codeword corresponding to the codeword index information from a set of codebooks according to the codeword index information, wherein the set of codebooks comprises $N_t$ codebooks corresponding respectively to respective ranks and the $N_t$ codebooks are determined based upon a codebook of rank 1 and a $N_t \times N_t$ Hadamard matrix, the first column of the Hadamard matrix is all 1 or all −1. As compared with the existing Rel-10 codebook, the codebooks designed according to the invention can reduce a feedback overhead and improve the average spectrum efficiency of a cell and spectrum efficiency of a user at the edge of the cell.

15 Claims, 4 Drawing Sheets

(56) References Cited

U.S. PATENT DOCUMENTS

| | | |
|---|---|---|
| 8,588,324 B2 * 11/2013 | Mondal et al. | 375/267 |
| 8,675,762 B2 * 3/2014 | Cheng et al. | 375/267 |
| 2008/0008110 A1 1/2008 | Kishigami et al. | |
| 2008/0186212 A1 * 8/2008 | Clerckx et al. | 341/55 |
| 2010/0054196 A1 * 3/2010 | Hui | 370/329 |
| 2010/0074353 A1 3/2010 | Zhou et al. | |
| 2010/0272206 A1 10/2010 | Mazzarese et al. | |

FOREIGN PATENT DOCUMENTS

| | | |
|---|---|---|
| JP | 2009-538556 | 11/2009 |
| WO | WO 2007/139325 | 12/2007 |
| WO | WO 2010/024589 A2 | 3/2010 |
| WO | WO 2010/143923 A2 | 12/2010 |

OTHER PUBLICATIONS

European Search Report dated Jul. 10, 2014.

Huawei, "Double codebook based Differential feedback," 3GPP TSG RAN WG1 meeting #61, Montreal Canada, May 10-14, 2010, 7 pages.

* cited by examiner

METHOD OF GENERATING CODEBOOK OF UNIFORM CIRCULAR ARRAY AND ACQUIRING CODEWORD FROM THE CODEBOOK

FIELD OF THE INVENTION

The present disclosure relates to radio communication, and particularly to a method of codebook design suitable for antennas configured in a uniform circular array in a Multiple-Input Multiple-Output (MIMO) radio communication system and a method and device for determining a codeword from a designed codebook in a base station configured with antennas in a uniform circular array.

BACKGROUND OF THE INVENTION

In a Frequency Division Duplex (FDD) system, quantization of Channel State Information (CSI) is a key issue. A Uniform Circular Array (UCA) is a typical antenna configuration of a base station. One way to quantize Channel State Information for UCA is to reuse a Rel-10 codebook. However the 8Tx Rel-10 codebook is designed for a linear antenna array but not well suitable for a uniform circular array.

A full codebook suitable for antennas configured in a uniform circular array has been absent so far.

SUMMARY OF THE INVENTION

In view of the foregoing problem, the invention provides a solution of designing a set of codebooks suitable for antennas configured in a uniform circular array. The set of codebooks designed according to the invention is suitable for a base station, in a MIMO communication system, configured with a number $N_t$ of transmission antennas configured in a uniform circular array, the set of codebooks including a number $N_t$ of codebooks corresponding respectively to respective ranks. The codebook generating method according to an embodiment of the invention includes the step of: determining the $N_t$ codebooks in the set of codebooks based upon a $N_t \times N_t$ Hadamard matrix D and a codebook $C_1$ of rank 1, wherein the first column of the Hadamard matrix D is all 1 or all −1, and the codebook of rank 1 is $$C_1 = \{W_1^{(mN+n)}, m = 0, 1, \ldots, M-1; n = 0, 1, \ldots, N-1\},$$

wherein $$W_1^{(mN+n)} = \mathrm{diag}(D(:,1)) \cdot v_{m,n},$$

$$V_{m,n} = \frac{1}{\sqrt{N_t}}\left[e^{-j\frac{2\pi R}{\lambda}\sin\left(\frac{\pi m}{M}\right)\cos\left(\frac{2\pi n}{N}-\theta_1\right)}, e^{-j\frac{2\pi R}{\lambda}\sin\left(\frac{\pi m}{M}\right)\cos\left(\frac{2\pi n}{N}-\theta_2\right)}, \ldots,\right.$$

$$\left. e^{-j\frac{2\pi R}{\lambda}\sin\left(\frac{\pi m}{M}\right)\cos\left(\frac{2\pi n}{N}-\theta_i\right)}, \ldots, e^{-j\frac{2\pi R}{\lambda}\sin\left(\frac{\pi m}{M}\right)\cos\left(\frac{2\pi n}{N}-\theta_{N_t}\right)}\right]^T,$$

$D(:,1)$ represents the first column of the Hadamard matrix D, $\mathrm{diag}(D(:,1))$ represents a diagonal matrix with main diagonal elements being the first column of the Hadamard matrix D, R represents the radius of the uniform circular array, $\theta_i$ represents an azimuth angle of the $i^{th}$ antenna, and $\lambda$ represents the wavelength of the electromagnetic wave emitted from the base station.

Particularly a codebook $C_r$ of rank r among the $N_t$ codebooks in the method may be determined in the formula of:

$$C_r = \{W_r^{(mN+n)}, m=0,1,\ldots,M-1; n=0,1,\ldots,N-1\},$$

wherein $W_r^{(mN+n)} = X_{m,n}(:,1:r)/\sqrt{r}$, $1 \leq r \leq N_t$, $X_{m,n}$ represents a $N_t \times N_t$ matrix, $X_{m,n}(:,1:r)$ represents a matrix composed of the first to $r^{th}$ column vectors of the matrix $X_{m,n}$, and $X_{m,n}$ is constructed by the equation of:

$$X_{m,n}(:,k) = \mathrm{diag}(D(:,k)) \cdot v_{m,n}, k=1,2,\ldots,N_t,$$

wherein D represents the $N_t \times N_t$ Hadamard matrix with the first column which is all 1 or all −1, $X_{m,n}(:,k)$ represents the $k^{th}$ column vector of the matrix $X_{m,n}$, $D(:,k)$ represents the $k^{th}$ column vector of the matrix D, and $\mathrm{diag}(D(:,k))$ represents a diagonal matrix with main diagonal elements being the $k^{th}$ column vector of the matrix D.

Respective codewords in the codebooks designed according to the codebook design solution of the invention have constant modulus, respective columns being orthogonal to each other, nested property, etc.

Based upon a set of codebooks designed according to the invention to be suitable for antennas configured in a uniform circular array, there is provided in an embodiment of the invention a method of determining a codeword in a base station of a MIMO communication system, the base station being configured with $N_t$ antennas in a uniform circular array, wherein the method comprises the steps of: receiving codeword index information from a user equipment; and determining a target codeword corresponding to the codeword index information from a set of codebooks according to the codeword index information, wherein the set of codebooks comprises $N_t$ codebooks corresponding respectively to respective ranks and the $N_t$ codebooks are determined based upon a $N_t \times N_t$ Hadamard matrix D and a codebook C1 of rank 1, wherein the first column of the Hadamard matrix D is all 1 or all −1, and the codebook of rank 1 is $$C_1 = \{W_1^{(mN+n)}, m = 0, 1, \ldots, M-1; n = 0, 1, \ldots, N-1\}, \text{wherein}$$

$$W_1^{(mN+n)} = \mathrm{diag}(D(:,1)) \cdot v_{m,n},$$

$$V_{m,n} = \frac{1}{\sqrt{N_t}}\left[e^{-j\frac{2\pi R}{\lambda}\sin\left(\frac{\pi m}{M}\right)\cos\left(\frac{2\pi n}{N}-\theta_1\right)}, e^{-j\frac{2\pi R}{\lambda}\sin\left(\frac{\pi m}{M}\right)\cos\left(\frac{2\pi n}{N}-\theta_2\right)}, \ldots,\right.$$

$$\left. e^{-j\frac{2\pi R}{\lambda}\sin\left(\frac{\pi m}{M}\right)\cos\left(\frac{2\pi n}{N}-\theta_i\right)}, \ldots, e^{-j\frac{2\pi R}{\lambda}\sin\left(\frac{\pi m}{M}\right)\cos\left(\frac{2\pi n}{N}-\theta_{N_t}\right)}\right]^T,$$

$D(:,1)$ represents the first column of the Hadamard matrix D, $\mathrm{diag}(D(:,1))$ represents a diagonal matrix with main diagonal elements being the first column of the Hadamard matrix D, R represents the radius of the uniform circular array, $\theta_i$ represents an azimuth angle of the $i^{th}$ antenna, and $\lambda$ represents the wavelength of the electromagnetic wave emitted from the base station.

Particularly a codebook $C_r$ of rank r among the $N_t$ codebooks in the method can be determined in the formula of:

$$C_r = \{W_r^{(mN+n)}, m=0,1,\ldots,M-1; n=0,1,\ldots,N-1\},$$

wherein $W_r^{(mN+n)} = X_{m,n}(:,1:r)/\sqrt{r}$, $1 \leq r \leq N_t$, $X_{m,n}$ represents a $N_t \times N_t$ matrix, $X_{m,n}(:,1:r)$ represents a matrix composed of the first to $r^{th}$ column vectors of the matrix $X_{m,n}$, and $X_{m,n}$ is constructed by the equation of:

$$X_{m,n}(:,k) = \mathrm{diag}(D(:,k)) \cdot v_{m,n}, k=1,2,\ldots,N_t,$$

wherein D represents the $N_t \times N_t$ Hadamard matrix with the first column which is all 1 or all −1, $X_{m,n}(:,k)$ represents the $k^{th}$ column vector of the matrix $X_{m,n}$, $D(:,k)$ represents the $k^{th}$ column vector of the matrix D, and diag(D(:,k)) represents a diagonal matrix with main diagonal elements being the $k^{th}$ column vector of the matrix D.

In another embodiment of the invention, there is provided a method of providing a base station with codeword index information in a user equipment of a MIMO communication system, the base station being configured with $N_t$ antennas in a uniform circular array, wherein the method comprises the steps of: determining a codeword from a set of codebooks according to an estimated channel matrix and based on a predetermined criterion; and transmitting codeword index information of the codeword to the base station, wherein the set of codebooks comprises $N_t$ codebooks corresponding respectively to respective ranks and the $N_t$ codebooks are determined based upon a $N_t \times N_t$ Hadamard matrix D and a codebook $C_1$ of rank 1, wherein the first column of the Hadamard matrix D is all 1 or all −1, and the codebook of rank 1 is $$C_1 = \{W_1^{(mN+n)}, m = 0, 1, \ldots, M-1; n = 0, 1, \ldots, N-1\}, \text{ wherein}$$

$$W_1^{(mN+n)} = \text{diag}(D(:,1)) \cdot v_{m,n},$$

$$V_{m,n} = \frac{1}{\sqrt{N_t}}$$

$$\left[ e^{-j\frac{2\pi R}{\lambda}\sin\left(\frac{\pi m}{M}\right)\cos\left(\frac{2\pi n}{N} - \theta_1\right)}, e^{-j\frac{2\pi R}{\lambda}\sin\left(\frac{\pi m}{M}\right)\cos\left(\frac{2\pi n}{N} - \theta_2\right)}, \ldots, \right.$$

$$\left. e^{-j\frac{2\pi R}{\lambda}\sin\left(\frac{\pi m}{M}\right)\cos\left(\frac{2\pi n}{N} - \theta_i\right)}, \ldots, e^{-j\frac{2\pi R}{\lambda}\sin\left(\frac{\pi m}{M}\right)\cos\left(\frac{2\pi n}{N} - \theta_{N_t}\right)} \right]^T,$$

D(:,1) represents the first column of the Hadamard matrix D, diag(D(:,1)) represents a diagonal matrix with main diagonal elements being the first column of the Hadamard matrix D, R represents the radius of the uniform circular array, $\theta_i$ represents an azimuth angle of the $i^{th}$ antenna, and $\lambda$ represents the wavelength of the electromagnetic wave emitted from the base station.

Particularly a codebook $C_r$ of rank r among the $N_t$ codebooks in the method is determined in the formula of:

$$C_r = \{W_r^{(mN+n)}, m=0,1,\ldots,M-1; n=0,1,\ldots,N-1\},$$

wherein $W_r^{(mN+n)} = X_{m,n}(:,1:r)/\sqrt{r}$, $1 \leq r \leq N_t$, $X_{m,n}$ represents a $N_t \times N_t$ matrix, $X_{m,n}(:,1:r)$ represents a matrix composed of the first to $r^{th}$ column vectors of the matrix $X_{m,n}$, and $X_{m,n}$ is constructed by the equation of:

$$X_{m,n}(:,k) = \text{diag}(D(:,k))^* v_{m,n}, k=1,2,\ldots,N_t,$$

wherein D represents the $N_t \times N_t$ Hadamard matrix with the first column which is all 1 or all −1, $X_{m,n}(:,k)$ represents the $k^{th}$ column vector of the matrix $X_{m,n}$, $D(:,k)$ represents the $k^{th}$ column vector of the matrix D, and diag(D(:,k)) represents a diagonal matrix with main diagonal elements being the $k^{th}$ column vector of the matrix D.

As compared with the existing Rel-10 codebook, the codebooks designed according to the invention can reduce a feedback overhead and improve the average spectrum efficiency of a cell and spectrum efficiency of a user at the edge of the cell.

In a further embodiment of the invention, there is provided a device for determining a codeword in a base station of a MIMO communication system, the base station being configured with $N_t$ antennas in a uniform circular array, wherein the device comprises: a first receiving unit for receiving codeword index information from a user equipment; and a first determining unit for determining a target codeword corresponding to the codeword index information from a set of codebooks according to the codeword index information, wherein the set of codebooks comprises $N_t$ codebooks corresponding respectively to respective ranks and the $N_t$ codebooks are determined based upon a $N_t \times N_t$ Hadamard matrix D and a codebook $C_1$ of rank 1, wherein the first column of the Hadamard matrix D is all 1 or all −1, and the codebook of rank 1 is $$C_1 = \{W_1^{(mN+n)}, m = 0, 1, \ldots, M-1; n = 0, 1, \ldots, N-1\}, \text{ wherein}$$

$$W_1^{(mN+n)} = \text{diag}(D(:,1)) \cdot v_{m,n},$$

$$V_{m,n} = \frac{1}{\sqrt{N_t}}$$

$$\left[ e^{-j\frac{2\pi R}{\lambda}\sin\left(\frac{\pi m}{M}\right)\cos\left(\frac{2\pi n}{N} - \theta_1\right)}, e^{-j\frac{2\pi R}{\lambda}\sin\left(\frac{\pi m}{M}\right)\cos\left(\frac{2\pi n}{N} - \theta_2\right)}, \ldots, \right.$$

$$\left. e^{-j\frac{2\pi R}{\lambda}\sin\left(\frac{\pi m}{M}\right)\cos\left(\frac{2\pi n}{N} - \theta_i\right)}, \ldots, e^{-j\frac{2\pi R}{\lambda}\sin\left(\frac{\pi m}{M}\right)\cos\left(\frac{2\pi n}{N} - \theta_{N_t}\right)} \right]^T,$$

D(:,1) represents the first column of the Hadamard matrix D, diag(D(:,1)) represents a diagonal matrix with main diagonal elements being the first column of the Hadamard matrix D, R represents the radius of the uniform circular array, $\theta_i$ represents an azimuth angle of the $i^{th}$ antenna, and $\lambda$ represents the wavelength of the electromagnetic wave emitted from the base station.

Particularly a codebook $C_r$ of rank r among the $N_t$ codebooks is determined in the formula of:

$$C_r = \{W_r^{(mN+n)}, m=0,1,\ldots,M-1; n=0,1,\ldots,N-1\},$$

wherein $W_r^{(mN+n)} = X_{m,n}(:,1:r)/\sqrt{r}$, $1 \leq r \leq N_t$, $X_{m,n}$ represents a $N_t \times N_t$ matrix, $X_{m,n}(:,1:r)$ represents a matrix composed of the first to $r^{th}$ column vectors of the matrix $X_{m,n}$, and $X_{m,n}$ is constructed by the equation of:

$$X_{m,n}(:,k) = \text{diag}(D(:,k))^* v_{m,n}, k=1,2,\ldots,N_t,$$

wherein D represents the $N_t \times N_t$ Hadamard matrix with the first column which is all 1 or all −1, $X_{m,n}(:,k)$ represents the $k^{th}$ column vector of the matrix $X_{m,n}$, $D(:,k)$ represents the $k^{th}$ column vector of the matrix D, and diag(D(:,k)) represents a diagonal matrix with main diagonal elements being the $k^{th}$ column vector of the matrix D.

In a further embodiment of the invention, there is provided a device for providing a base station with codeword index information in a user equipment of a MIMO communication system, the base station being configured with $N_t$ antennas in a uniform circular array, wherein the device comprises: a second determining unit for determining a codeword from a set of codebooks according to an estimated channel matrix and based on a predetermined criterion; and a first transmitting unit for transmitting codeword index information of the codeword to the base station, wherein the set of codebooks comprises $N_t$ of codebooks corresponding respectively to respective ranks and the $N_t$ codebooks are determined based upon a $N_t \times N_t$ Hadamard matrix D and a codebook $C_1$ of rank 1, wherein the first column of the Hadamard matrix D is all 1 or all −1, and the codebook of rank 1 is $$C_1 = \{W_1^{(mN+n)}, m = 0, 1, \ldots, M-1; n = 0, 1, \ldots, N-1\}, \text{ wherein}$$

$$W_1^{(mN+n)} = \text{diag}(D(:,1)) \cdot v_{m,n},$$

-continued $$V_{m,n} = \frac{1}{\sqrt{N_t}} \left[ e^{-j\frac{2\pi R}{\lambda}\sin\left(\frac{\pi m}{M}\right)\cos\left(\frac{2\pi n}{N}-\theta_1\right)}, e^{-j\frac{2\pi R}{\lambda}\sin\left(\frac{\pi m}{M}\right)\cos\left(\frac{2\pi n}{N}-\theta_2\right)}, \ldots, \right.$$
$$\left. e^{-j\frac{2\pi R}{\lambda}\sin\left(\frac{\pi m}{M}\right)\cos\left(\frac{2\pi n}{N}-\theta_i\right)}, \ldots, e^{-j\frac{2\pi R}{\lambda}\sin\left(\frac{\pi m}{M}\right)\cos\left(\frac{2\pi n}{N}-\theta_{N_t}\right)} \right]^T,$$

$D(:,1)$ represents the first column of the Hadamard matrix D, diag($D(:,1)$) represents a diagonal matrix with main diagonal elements being the first column of the Hadamard matrix D, R represents the radius of the uniform circular array, $\theta_i$ represents an azimuth angle of the $i^{th}$ antenna, and $\lambda$ represents the wavelength of the electromagnetic wave emitted from the base station.

Particularly a codebook $C_r$ of rank r among the $N_t$ codebooks is determined in the formula of:

$$C_r = \{W_r^{(mN+n)}, m=0,1,\ldots,M-1; n=0,1,\ldots,N-1\},$$

wherein $W_r^{(mN+n)} = X_{m,n}(:,1:r)/\sqrt{r}$, $1 \leq r \leq N_t$, $X_{m,n}$ represents a $N_t \times N_t$ matrix, $X_{m,n}(:,1:r)$ represents a matrix composed of the first to $r^{th}$ column vectors of the matrix $X_{m,n}$, and $X_{m,n}$ is constructed by the equation of:

$$X_{m,n}(:,k) = \text{diag}(D(:,k))^* v_{m,n}, k=1,2,\ldots,N_t,$$

wherein D represents the $N_t \times N_t$ Hadamard matrix with the first column which is all 1 or all $-1$, $X_{m,n}(:,k)$ represents the $k^{th}$ column vector of the matrix $X_{m,n}$, $D(:,k)$ represents the $k^{th}$ column vector of the matrix D, and diag($D(:,k)$) represents a diagonal matrix with main diagonal elements being the $k^{th}$ column vector of the matrix D.

The respective aspects of the invention will become more apparent from the following description of the specific embodiments.

BRIEF DESCRIPTION OF DRAWINGS

The foregoing and other features of the invention will become more apparent upon review of the following detailed description of non-limiting embodiments with reference to the drawings in which.

Identical or like reference numerals in the drawings denote identical or like components.

DETAILED DESCRIPTION OF EMBODIMENTS

In a downlink MIMO communication system, there is assumed a base station configured with a number $N_t$ of transmission antennas configured in a uniform circular array. Since the base station is configured with a number $N_t$ of transmission antennas, a total number $N_t$ of codebooks will be designed in a codebook design solution of the invention respectively as a codebook of rank 1, a codebook of rank 2, a codebook of rank 3, ......, and a codebook of rank $N_t$. The $N_t$ codebooks constitute a set of codebooks stored respectively at the side of a base station and the side of a user equipment.

Hereinafter a method of designing the respective codebooks in the set of codebooks according to the invention will be described in details.

Since the $N_t$ transmission antennas of the base station are configured in a uniform circular array, an azimuth angle $\theta_n$ of the $n^{th}$ antenna among the $N_t$ transmission antennas can be represented in the equation of:

$$\theta_n = \frac{2\pi}{N_t}(n-1), \quad n=1,2,\ldots N_t$$

$(\alpha,\beta)$ represent Angles of Departure (AODs) of an electromagnetic wave emitted from the base station, where $\alpha$ represents an azimuth angle and $\beta$ represents an elevation angle. According to the antenna theory, the array response of antennas of the base station is in the form of:

$$v = \left[ e^{-j\frac{2\pi R}{\lambda}\sin\beta\cos(\alpha-\theta_1)}, e^{-j\frac{2\pi R}{\lambda}\sin\beta\cos(\alpha-\theta_2)}, \ldots, e^{-j\frac{2\pi R}{\lambda}\sin\beta\cos(\alpha-\theta_{N_t})} \right]^T \quad (1)$$

Where $\alpha \in [0,2\pi)$, $\beta \in [0,\pi)$, R represents the radius of the uniform circular array, and $\lambda$ represents the wavelength of the electromagnetic wave emitted from the base station.

$\alpha$ is quantized uniformly with a number N of values and $\beta$ is quantized uniformly with a number M of values to result in the equation of:

$$v_{m,n} = \frac{1}{\sqrt{N_t}} \left[ e^{-j\frac{2\pi R}{\lambda}\sin\left(\frac{\pi m}{M}\right)\cos\left(\frac{2\pi n}{N}-\theta_1\right)}, \right. \quad (2)$$
$$\left. e^{-j\frac{2\pi R}{\lambda}\sin\left(\frac{\pi m}{M}\right)\cos\left(\frac{2\pi n}{N}-\theta_2\right)}, \ldots, e^{-j\frac{2\pi R}{\lambda}\sin\left(\frac{\pi m}{M}\right)\cos\left(\frac{2\pi n}{N}-\theta_{N_t}\right)} \right]^T$$

Where $m=0,1,\ldots,M-1$, and $n=0,1,\ldots,N-1$.

The respective codebooks in the set of codebooks according to the invention can be derived respectively in the equation (2).

The codebook of rank 1 can be represented as:

$$C_1 = \{W_1^{(mN+n)}, m=0,1,\ldots,M-1; n=0,1,\ldots,N-1\} \quad (3)$$

Where $W_1^{(mN+n)} = v_{m,n}$.

The codebook of rank 1 includes a number $M^*N$ of codewords with a number $\log_2(M)+\log_2(N)$ of bits.

To construct a codebook with respective columns orthogonal to each other, a codebook of higher rank can be got by linear transform on the codebook of rank 1 using a Hadamard matrix.

Firstly a $N_t \times N_t$ matrix $X_{m,n}$ is defined, which can be built as:

$$X_{m,n}(:,k) = \text{diag}(D(:,k))^* v_{m,n}, k=1,2,\ldots,N_t \quad (4)$$

Where D represents a $N_t \times N_t$ Hadamard matrix with the first column which is all 1 or all $-1$, $X_{m,n}(:,k)$ represents the $k^{th}$ column vector of the matrix $X_{m,n}$, $D(:,k)$ represents the $k^{th}$ column vector of the matrix D, and diag($D(:,k)$) represents a diagonal matrix with main diagonal elements being the $k^{th}$ column vector of the matrix D.

Since respective columns of the Hadamard matrix are orthogonal to each other, respective columns of the matrix $X_{m,n}$ derived in the matrix (4) are also orthogonal to each other.

Therefore a codebook of rank r ($1 \leq r \leq N_t$) can be represented as:

$$C_r = \{W_r^{(mN+n)}, m=0,1,\ldots,M-1; n=0,1,\ldots,N-1\} \quad (5)$$

Where $W_r^{(mN+n)} = X_{m,n}(:,1:r)/\sqrt{r}$, $X_{m,n}(:,1:r)$ represents a matrix composed of the first to $r^{th}$ column vectors of the matrix $X_{m,n}$, and $/\sqrt{r}$ represents normalization.

The codebook of rank r includes a number M*N of codewords, and the number of required bits is $\log_2(M) + \log_2(N)$.

The codebooks of rank 1, rank 2, rank 3, ..., rank $N_t$ can be derived in the foregoing way, and these $N_t$ codebooks constitute a set of codebooks. Codewords in the respective codebooks have constant modulus, the respective columns being orthogonal to each other and nested property In the downlink MIMO communication system where antennas of the base station are configured in a uniform circular array, the set of codebooks generated in the foregoing way is stored respectively at the side of the base station and the side of the user equipment to quantize a channel matrix.

A method of determining a codeword from the set of codebooks generated in the foregoing way will be described below.

Figure 1:
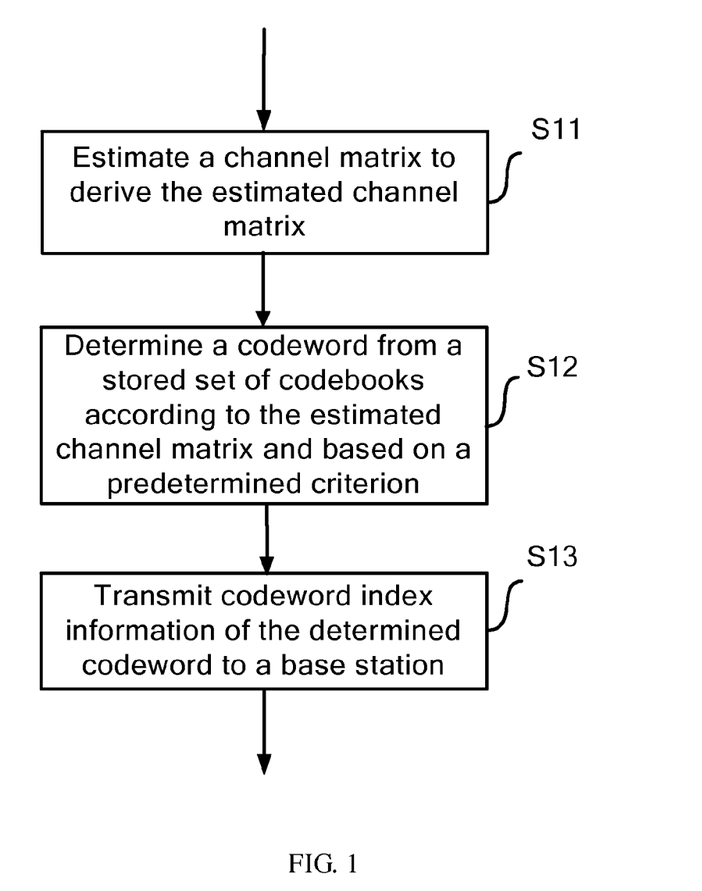
FIG. 1 is a flow chart of a method of providing a base station with codeword index information in a user equipment of a MIMO communication system according to an embodiment of the invention.

Referring to FIG. 1, firstly in the step S11, a user equipment 10 estimates a channel matrix from, for example, a reference signal to derive the estimated channel matrix.

Then in the step S12, the user equipment 10 determines a codeword from a stored set of codebooks according to the estimated channel matrix and based on a predetermined criterion.

The predetermined criterion may be a maximized capacity criterion, for example, which can be known to those skilled in the art and will not be detailed here so to avoid a repeated description.

Next in the step S13, the user equipment 10 transmits codeword index information of the determined codeword to a base station 20. The codeword index information can include rank indication information and codeword indication information. The rank indication information recommends the desired number of data streams to the base station 20, and the codeword indication information recommends the codeword to the base station 20.

Figure 2:
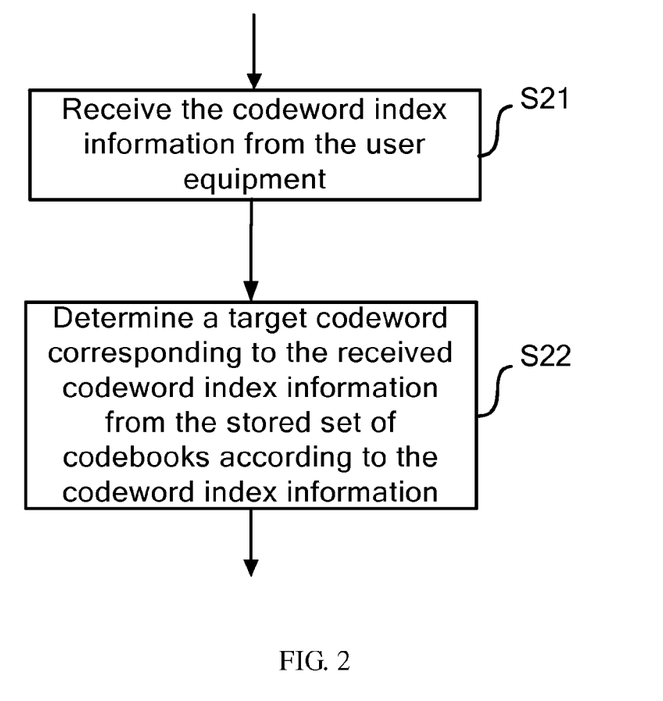
FIG. 2 is a flow chart of a method of determining a codeword in a base station of a MIMO communication system according to an embodiment of the invention.

Referring to FIG. 2, the base station 20 receives the codeword index information from the user equipment 10 in the step S21.

Then in the step S22, the base station 20 determines a target codeword corresponding to the received codeword index information from the stored set of codebooks according to the codeword index information.

Particularly in the case that the codeword index information includes the rank indication information and the codeword indication information, the base station 20 firstly determines a target codebook corresponding to the rank indication information from the set of codebooks according to the rank indication information and then determines a target codeword corresponding to the codeword indication information from the determined target codebook according to the codeword indication information.

For example, when the rank indication information indicates the rank of 2, the base station 20 firstly determines the codebook of rank 2 from the set of codebooks and then determines a target codeword from the codebook of rank 2 according to the codeword indication information.

In an embodiment, there is an example in which the base station is configured with eight transmission antennas configured in a uniform circular array.

The radius of the uniform circular array is assumed to be equal to 0.6 time the wavelength of an emitted electromagnetic wave, that is, $R=0.6\lambda$. During the transmission of electromagnetic wave, for the sake of simplicity, only an elevation angle but no azimuth angle is considered, that is, the elevation angle is $$\beta = \frac{\pi}{2}.$$

α is quantized uniformly with sixteen values, that is, N=16.

In the equations (2) to (5), a codebook of rank r ($1 \leq r \leq 8$) can be represented in the equation of:

$$C_r = \{W_r^{(n)}, n=0,1,\ldots,15\}$$

Where $W_r^{(n)} = X_n(:,1:r)/\sqrt{r}$, $X_n$ represents a 8×8 matrix with the $k^{th}$ column vector which can be represented in the equation of:

$$X_n(:,k) = \text{diag}(D(:,k)) * v_n, \quad k=1,2,\ldots,8$$

Where $$v_n = \left[ e^{-j1.2\pi\cos\left(\frac{\pi n}{8}\right)}, e^{-j1.2\pi\cos\left(\frac{\pi n}{8} - \frac{\pi}{4}\right)}, \ldots, e^{-j1.2\pi\cos\left(\frac{\pi n}{8} - \frac{7\pi}{4}\right)} \right]^T,$$

and the Hadamard matrix D can be, for example:

$$D = \begin{bmatrix} 1 & 1 & 1 & 1 & 1 & 1 & 1 & 1 \\ 1 & 1 & -1 & 1 & -1 & -1 & -1 & 1 \\ 1 & -1 & -1 & -1 & 1 & 1 & -1 & 1 \\ 1 & -1 & 1 & -1 & -1 & -1 & 1 & 1 \\ 1 & 1 & 1 & -1 & -1 & 1 & -1 & -1 \\ 1 & 1 & -1 & -1 & 1 & -1 & 1 & -1 \\ 1 & -1 & -1 & 1 & -1 & 1 & 1 & -1 \\ 1 & -1 & 1 & 1 & 1 & -1 & -1 & -1 \end{bmatrix}$$

In a communication experiment conducted according to the foregoing embodiment, system simulation is performed over a 19 cells. Simulation parameters and assumptions are as depicted in Table 1.

TABLE 1

| Simulation parameters and modeling assumptions | |
|---|---|
| parameters | assumptions |
| Site-to-site distance | 150 m |
| Carrier frequency | 2.5 GHz |
| Bandwidth | 10 MHz |
| Path loss | 36.7 $\log_{10}$(d) + 22.7 + 26 $\log_{10}$(f) (d in m, f in GHz) |
| BS antenna gain + connector loss | 5dBi |
| Tx power per antenna | 24dBm |
| Min drop distance | 10 m |
| Shadowing standard deviation | 10 dB |
| Shadow correlation | 0.5 between cells |
| Penetration loss | 20 dB |
| Noise figure at receiver | 7 dB |
| Duplex method | FDD |
| Number of users per cell | uniform, 10 per small cell, associated to max SINR cell |
| Channel model | 3GPP Urban Macro |
| Antenna configuration | 8-Tx eNB: UCA radius 0.6-wavelength<br>2-Rx UE: ULA, 0.5-wavelength antenna spacing |

TABLE 1-continued

Simulation parameters and modeling assumptions

| parameters | assumptions |
|---|---|
| Scheduler | Proportional fair and frequency selective scheduling; Scheduling granularity of one sub-frame |
| Link adaptation | non-ideal CQI (i.e. feedback CQI is quantized according to MCS level |
| Channel estimation | Ideal channel estimation |
| Feedback impairments | CQI/PMI reporting period: 5 ms CQI/PMI feedback: sub-band (5 RB)/wideband (all RBs) Delay: 6 ms |
| Downlink pre-coding | SU-MIMO: codebook based for FDD |
| Control channel and reference signal overhead | Fixed at 0.3063 (As agreed in ITU evaluation) |
| Codebook | Rel-10 codebook 4-bit proposed codebook |
| MIMO parameters | Rank adaptation for SU-MIMO |
| Test configuration | 3 drop, each with 300 sub-frames |

The performance comparison between the codebooks designed according to the invention and the Rel-10 codebook is as depicted in Table 2. As can be apparent from Table 2, the performance of the codebooks of the invention is superior significantly to that of the Rel-10 codebook. For a feedback overhead, the Rel-10 codebook needs both four bits for wideband and four bits for each sub-band, while the codebooks designed according to the invention need merely four bits for each sub-band.

TABLE 2

8-Tx simulation results

| Codebook type | Average cell spectral efficiency (bits/s/Hz) | 5% Cell edge spectral efficiency (bits/s/Hz) |
|---|---|---|
| Rel-10 codebook | 1.90 (100%) | 0.036 (100%) |
| Proposed 4-bit codebook | 2.25 (118.4%) | 0.059 (163.9%) |

Figure 3:
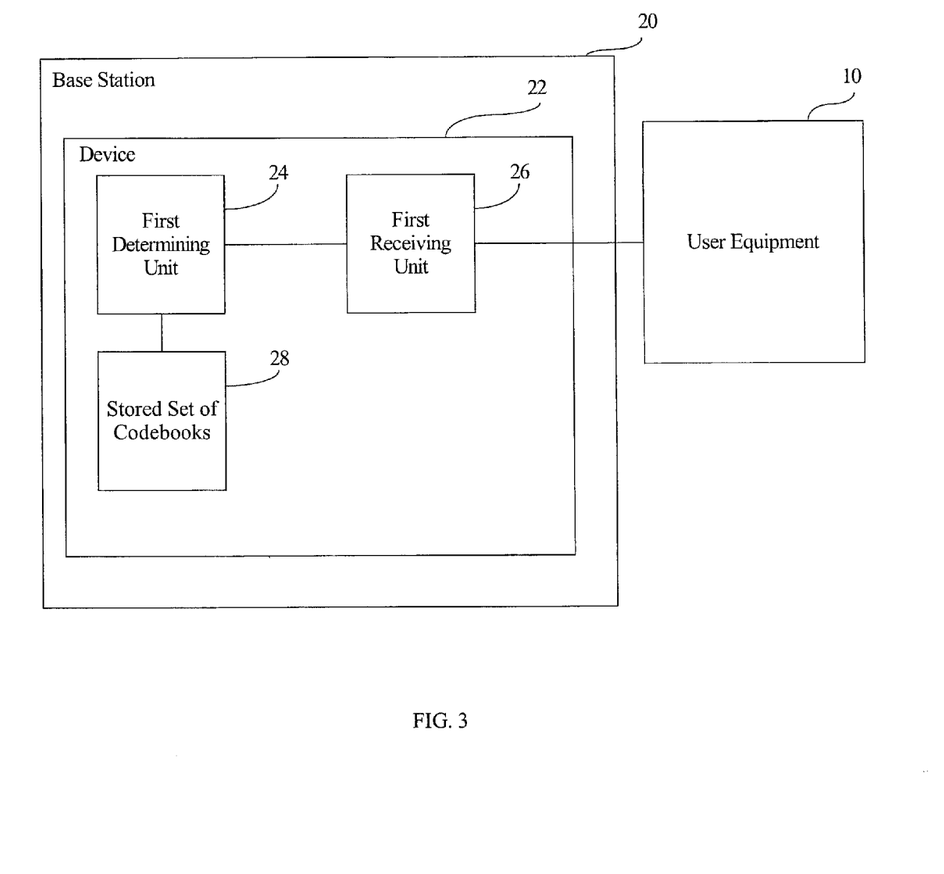
FIGS. 3 and 4 show devices according to embodiments of the invention.

Referring to FIG. 3, a device 22 within the base station 20 includes a first determining unit 24, a first receiving unit 26, and a stored set of codebooks 28. The first receiving unit 26 receives codeword index information from the user equipment 10. The first determining unit 24 determines a target codeword corresponding to the received codeword index information from is the stored set of codebooks 28.

Figure 4:
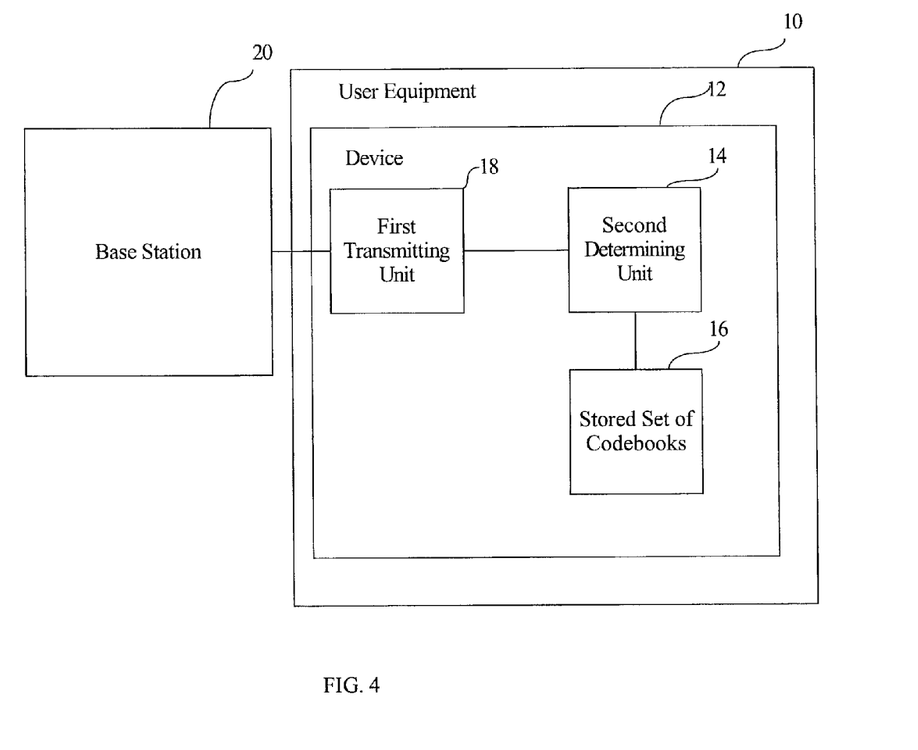

Referring to FIG. 4, a device 12, within the user equipment 10, includes a second determining unit 14, a stored set of codebooks 16, and a first transmitting unit 18. The user equipment 10 estimates a channel matrix. The second determining unit 14 determines a codeword from a stored set of codebooks 16 according to the estimated channel matrix and based on a predetermined criterion. The first transmitting unit 18 then transmits codeword index information of the determined codeword to the base station 20.

As can be apparent to those skilled in the art, the invention will not be limited to the details of the foregoing exemplary embodiments but can be embodied in other specific forms without departing from the spirit or scope of the invention. Accordingly the embodiments shall be construed in an illustrative but not limiting sense in any respect, and any reference numerals in the claims shall not be construed as limiting the claims in question. Furthermore it will be obvious that the term "comprising" will not preclude presence of another element(s) or step(s), and the term "a" or "an" preceding an element will not preclude inclusion of "a plural of" such elements. A plurality of elements stated in a product clam can alternatively be embodied in software or hardware as a single element. The terms "first", "second", etc., are intended to represent a name but not to suggest any specific order.

The invention claimed is:

1. A method of generating a set of codebooks, the set of codebooks being suitable for a MIMO communication system in which a base station is configured with $N_t$ transmission antennas and the $N_t$ transmission antennas are configured in a uniform circular array, the set of codebooks comprising $N_t$ codebooks corresponding respectively to respective ranks, wherein the method comprises:
    determining the $N_t$ codebooks in the set of codebooks based upon a $N_t \times N_t$ Hadamard matrix D and a codebook $C_1$ of rank 1,
    wherein the first column of the Hadamard matrix D is all 1 or all −1, and the codebook of rank 1 is $$C_1 = \{W_1^{(mN+n)}, m = 0, 1, \ldots, M-1; n = 0, 1, \ldots, N-1\}, \text{wherein}$$

$$W_1^{(mN+n)} = \text{diag}(D(:,1)) \cdot v_{m,n},$$

$$v_{m,n} = \frac{1}{\sqrt{N_t}}$$

$$\left[ e^{-j\frac{2\pi R}{\lambda}\sin\left(\frac{\pi m}{M}\right)\cos\left(\frac{2\pi n}{N}-\theta_1\right)}, e^{-j\frac{2\pi R}{\lambda}\sin\left(\frac{\pi m}{M}\right)\cos\left(\frac{2\pi n}{N}-\theta_2\right)}, \ldots, \right.$$

$$\left. e^{-j\frac{2\pi R}{\lambda}\sin\left(\frac{\pi m}{M}\right)\cos\left(\frac{2\pi n}{N}-\theta_i\right)}, \ldots, e^{-j\frac{2\pi R}{\lambda}\sin\left(\frac{\pi m}{M}\right)\cos\left(\frac{2\pi n}{N}-\theta_{N_t}\right)} \right]^T,$$

$D(:,1)$ represents the first column of the Hadamard matrix D, $\text{diag}(D(:,1))$ represents a diagonal matrix with main diagonal elements being the first column of the Hadamard matrix D, R represents the radius of the uniform circular array, $\theta_i$ represents an azimuth angle of the $i^{th}$ antenna, and $\lambda$ represents the wavelength of the electromagnetic wave emitted from the base station.

2. The method according to claim 1, wherein a codebook $C_r$ of rank r among the $N_t$ codebooks is determined in the formula of:

$$C_r = \{W_r^{(mN+n)}, m=0,1,\ldots,M-1; n=0,1,\ldots,N-1\},$$

wherein $W_r^{(mN+n)} = X_{m,n}(:,1:r)/\sqrt{r}$, $1 \le r \le N_t$, $X_{m,n}$ represents a $N_t \times N_t$ matrix, $X_{m,n}(:,1:r)$ represents a matrix composed of the first to $r^{th}$ column vectors of the matrix $X_{m,n}$, and $X_{m,n}$ is constructed by the equation of:

$$X_{m,n}(:,k) = \text{diag}(D(:,k)) \cdot v_{m,n}, k=1,2,\ldots,N_t,$$

wherein D represents the $N_t \times N_t$ Hadamard matrix with the first column which is all 1 or all −1, $X_{m,n}(:,k)$ represents the $k^{th}$ column vector of the matrix $X_{m,n}$, $D(:,k)$ represents the $k^{th}$ column vector of the matrix D, and $\text{diag}(D(:,k))$ represents a diagonal matrix with main diagonal elements being the $k^{th}$ column vector of the matrix D.

3. A method of determining a codeword in a base station of a MIMO communication system, the base station being configured with $N_t$ antennas in a uniform circular array, wherein the method comprises:
    receiving codeword index information from a user equipment; and
    determining a target codeword corresponding to the codeword index information from a set of codebooks according to the codeword index information, determining a target codeword corresponding to the codeword index information from a set of codebooks according to the codeword index information, wherein the set of codebooks comprises $N_t$ codebooks corresponding respectively to respective ranks and the $N_t$ codebooks are determined based on a $N_t \times N_t$ Hadamard matrix D and a codebook $C_1$ of rank 1,
wherein the first column of the Hadamard matrix D is all 1 or all −1, and the codebook of rank 1 is $$C_1 = \{W_1^{(mN+n)}, m = 0, 1, \ldots, M-1; n = 0, 1, \ldots, N-1\}, \text{ wherein}$$

$$W_1^{(mN+n)} = \text{diag}(D(:,1)) \cdot v_{m,n},$$

$$V_{m,n} = \frac{1}{\sqrt{N_t}}$$

$$\left[ e^{-j\frac{2\pi R}{\lambda} \sin\left(\frac{\pi m}{M}\right) \cos\left(\frac{2\pi n}{N} - \theta_1\right)}, e^{-j\frac{2\pi R}{\lambda} \sin\left(\frac{\pi m}{M}\right) \cos\left(\frac{2\pi n}{N} - \theta_2\right)}, \ldots, \right.$$

$$\left. e^{-j\frac{2\pi R}{\lambda} \sin\left(\frac{\pi m}{M}\right) \cos\left(\frac{2\pi n}{N} - \theta_i\right)}, \ldots, e^{-j\frac{2\pi R}{\lambda} \sin\left(\frac{\pi m}{M}\right) \cos\left(\frac{2\pi n}{N} - \theta_{N_t}\right)} \right]^T,$$

$D(:,1)$ represents the first column of the Hadamard matrix D, $\text{diag}(D(:,1))$ represents a diagonal matrix with main diagonal elements being the first column of the Hadamard matrix D, R represents the radius of the uniform circular array, $\theta_i$ represents an azimuth angle of the $i^{th}$ antenna, and $\lambda$ represents the wavelength of the electromagnetic wave emitted from the base station.

4. The method according to claim 3, wherein a codebook $C_r$ of rank r among the $N_t$ codebooks is determined in the formula of:

$$C_r = \{W_r^{(mN+n)}, m=0,1,\ldots,M-1; n=0,1,\ldots,N-1\},$$

wherein $W_r^{(mN+n)} = X_{m,n}(:,1:r)/\sqrt{r}$, $1 \leq r \leq N_t$, $X_{m,n}$ represents a $N_t \times N_t$ matrix, $X_{m,n}(:,1:r)$ represents a matrix composed of the first to $r^{th}$ column vectors of the matrix $X_{m,n}$, and $X_{m,n}$ is constructed by the equation of:

$$X_{m,n}(:,k) = \text{diag}(D(:,k)) * v_{m,n}, k=1,2,\ldots,N_t,$$

wherein D represents the $N_t \times N_t$ Hadamard matrix with the first column which is all 1 or all −1, $X_{m,n}(:,k)$ represents the $k^{th}$ column vector of the matrix $X_{m,n}$, $D(:,k)$ represents the $k^{th}$ column vector of the matrix D, and $\text{diag}(D(:,k))$ represents a diagonal matrix with main diagonal elements being the $k^{th}$ column vector of the matrix D.

5. The method according to claim 3, wherein the codeword index information comprises rank indication information and codeword indication information, and the determining comprises:
   determining a target codebook corresponding to the rank indication information from the set of codebooks according to the rank indication information; and
   determining the target codeword corresponding to the codeword indication information from the target codebook according to the codeword indication information.

6. A method of providing a base station with codeword index information in a user equipment of a MIMO communication system, the base station being configured with $N_t$ antennas in a uniform circular array, wherein the method comprises:
   determining a codeword from a set of codebooks according to an estimated matrix and based on a predetermined criterion; and
   transmitting codeword index information of the codeword to the base station,
   wherein the set of codebooks comprises $N_t$ codebooks corresponding respectively to respective ranks and the $N_t$ codebooks are determined based upon a $N_t \times N_t$ Hadamard matrix D and a codebook $C_1$ of rank 1,
   wherein the first column of the Hadamard matrix D is all 1 or all −1, and the codebook of rank 1 is $$C_1 = \{W_1^{(mN+n)}, m = 0, 1, \ldots, M-1; n = 0, 1, \ldots, N-1\}, \text{ wherein}$$

$$W_1^{(mN+n)} = \text{diag}(D(:,1)) \cdot v_{m,n},$$

$$V_{m,n} = \frac{1}{\sqrt{N_t}}$$

$$\left[ e^{-j\frac{2\pi R}{\lambda} \sin\left(\frac{\pi m}{M}\right) \cos\left(\frac{2\pi n}{N} - \theta_1\right)}, e^{-j\frac{2\pi R}{\lambda} \sin\left(\frac{\pi m}{M}\right) \cos\left(\frac{2\pi n}{N} - \theta_2\right)}, \ldots, \right.$$

$$\left. e^{-j\frac{2\pi R}{\lambda} \sin\left(\frac{\pi m}{M}\right) \cos\left(\frac{2\pi n}{N} - \theta_i\right)}, \ldots, e^{-j\frac{2\pi R}{\lambda} \sin\left(\frac{\pi m}{M}\right) \cos\left(\frac{2\pi n}{N} - \theta_{N_t}\right)} \right]^T,$$

$D(:,1)$ represents the first column of the Hadamard matrix D, $\text{diag}(D(:,1))$ represents a diagonal matrix with main diagonal elements being the first column of the Hadamard matrix D, R represents the radius of the uniform circular array, $\theta_i$ represents an azimuth angle of the $i^{th}$ antenna, and $\lambda$ represents the wavelength of the electromagnetic wave emitted from the base station.

7. The method according to claim 6, wherein a codebook $C_r$ of rank r among the $N_t$ codebooks is determined in the formula of:

$$C_r = \{W_r^{(mN+n)}, m=0,1,\ldots,M-1; n=0,1,\ldots,N-1\},$$

wherein $W_r^{(mN+n)} = X_{m,n}(:,1:r)/\sqrt{r}$, $1 \leq r \leq N_t$, $X_{m,n}$ represents a $N_t \times N_t$ matrix, $X_{m,n}(:,1:r)$ represents a matrix composed of the first to $r^{th}$ column vectors of the matrix $X_{m,n}$, and $X_{m,n}$ is constructed by the equation of:

$$X_{m,n}(:,k) = \text{diag}(D(:,k)) * v_{m,n}, k=1,2,\ldots,N_t,$$

wherein D represents the $N_t \times N_t$ Hadamard matrix with the first column which is all 1 or all −1, $X_{m,n}(:,k)$ represents the $k^{th}$ column vector of the matrix $X_{m,n}$, $D(:,k)$ represents the $k^{th}$ column vector of the matrix D, and $\text{diag}(D(:,k))$ represents a diagonal matrix with main diagonal elements being the $k^{th}$ column vector of the matrix D.

8. The method according to claim 6, wherein the codeword index information comprises rank indication information and codeword indication information.

9. The method according to claim 6, wherein the predetermined criterion comprises a maximized capacity criterion.

10. A device for determining a codeword in a base station of a MIMO communication system, the base station being configured with $N_t$ antennas in a uniform circular array, wherein the device comprises:
   a first receiver configured to receive codeword index information from a user equipment; and
   a first determiner configured to receive codeword index information from the first receiver and further configured to determine a target codeword corresponding to the codeword index information from a set of codebooks according to the codeword index information,
   wherein the set of codebooks comprises $N_t$ codebooks corresponding respectively to respective ranks and the $N_t$ codebooks are determined based upon a $N_t \times N_t$ Hadamard matrix D and a codebook $C_1$ of rank 1,
   wherein the first column of the Hadamard matrix D is all 1 or all −1, and the codebook of rank 1 is $$C_1 = \{W_1^{(mN+n)}, m = 0, 1, \ldots, M-1; n = 0, 1, \ldots, N-1\}, \text{ wherein}$$

$$W_1^{(mN+n)} = \text{diag}(D(:,1)) \cdot v_{m,n},$$

-continued $$V_{m,n} = \frac{1}{\sqrt{N_t}} \left[ e^{-j\frac{2\pi R}{\lambda}\sin\left(\frac{\pi m}{M}\right)\cos\left(\frac{2\pi n}{N} - \theta_1\right)}, e^{-j\frac{2\pi R}{\lambda}\sin\left(\frac{\pi m}{M}\right)\cos\left(\frac{2\pi n}{N} - \theta_2\right)}, \ldots, \right.$$

$$\left. e^{-j\frac{2\pi R}{\lambda}\sin\left(\frac{\pi m}{M}\right)\cos\left(\frac{2\pi n}{N} - \theta_i\right)}, \ldots, e^{-j\frac{2\pi R}{\lambda}\sin\left(\frac{\pi m}{M}\right)\cos\left(\frac{2\pi n}{N} - \theta_{N_t}\right)} \right]^T,$$

$D(:,1)$ represents the first column of the Hadamard matrix $D$, $\text{diag}(D(:,1))$ represents a diagonal matrix with main diagonal elements being the first column of the Hadamard matrix $D$, $R$ represents the radius of the uniform circular array, $\theta_i$ represents an azimuth angle of the $i^{th}$ antenna, and $\lambda$ represents the wavelength of the electromagnetic wave emitted from the base station.

11. The method according to claim 10, wherein a codebook $C_r$ of rank r among the $N_t$ codebooks is determined in the formula of:

$$C_r = \{W_r^{(mN+n)}, m=0,1,\ldots,M-1; n=0,1,\ldots,N-1\},$$

wherein $W_r^{(mN+n)} = X_{m,n}(:,1:r)/\sqrt{r}$, $1 \leq r \leq N_t$, $X_{m,n}$ represents a $N_t \times N_t$ matrix, $X_{m,n}(:,1:r)$ represents a matrix composed of the first to $r^{th}$ column vectors of the matrix $X_{m,n}$, and $X_{m,n}$ is constructed by the equation of:

$$X_{m,n}(:,k) = \text{diag}(D(:,k)) * v_{m,n}, \, k=1,2,\ldots,N_t,$$

wherein $D$ represents the $N_t \times N_t$ Hadamard matrix with the first column which is all 1 or all −1, $X_{m,n}(:,k)$ represents the $k^{th}$ column vector of the matrix $X_{m,n}$, $D(:,k)$ represents the $k^{th}$ column vector of the matrix $D$, and $\text{diag}(D(:,k))$ represents a diagonal matrix with main diagonal elements being the $k^{th}$ column vector of the matrix $D$.

12. The device according to claim 10, wherein the codeword index information comprises rank indication information and codeword indication information, and the first determining unit is further configured to determine a target codebook corresponding to the rank indication information from the set of codebooks according to the rank indication information and for determining the target codeword corresponding to the codeword indication information from the target codebook according to the codeword indication information.

13. A device for providing a base station with codeword index information in a user equipment of a MIMO communication system, the base station being configured with $N_t$ antennas in a uniform circular array, wherein the device comprises:

a second determiner configured to determine a codeword from a set of codebooks according to an estimated channel matrix and based on a predetermined criterion and provide the codeword to a transmitter; and wherein the transmitter is configured to transmit codeword index information of the codeword to the base station, wherein the set of codebooks comprises $N_t$ codebooks corresponding respectively to respective ranks and the $N_t$ codebooks are determined based upon a $N_t \times N_t$ Hadamard matrix $D$ and a codebook $C_1$ of rank 1, wherein the first column of the Hadamard matrix $D$ is all 1 or all −1, and the codebook of rank 1 is $$C_1 = \{W_1^{(mN+n)}, m=0,1,\ldots,M-1; n=0,1,\ldots,N-1\}, \text{ wherein}$$

$$W_1^{(mN+n)} = \text{diag}(D(:,1)) \cdot v_{m,n},$$

$$V_{m,n} = \frac{1}{\sqrt{N_t}} \left[ e^{-j\frac{2\pi R}{\lambda}\sin\left(\frac{\pi m}{M}\right)\cos\left(\frac{2\pi n}{N} - \theta_1\right)}, e^{-j\frac{2\pi R}{\lambda}\sin\left(\frac{\pi m}{M}\right)\cos\left(\frac{2\pi n}{N} - \theta_2\right)}, \ldots, \right.$$

$$\left. e^{-j\frac{2\pi R}{\lambda}\sin\left(\frac{\pi m}{M}\right)\cos\left(\frac{2\pi n}{N} - \theta_i\right)}, \ldots, e^{-j\frac{2\pi R}{\lambda}\sin\left(\frac{\pi m}{M}\right)\cos\left(\frac{2\pi n}{N} - \theta_{N_t}\right)} \right]^T,$$

$D(:,1)$ represents the first column of the Hadamard matrix $D$, $\text{diag}(D(:,1))$ represents a diagonal matrix with main diagonal elements being the first column of the Hadamard matrix $D$, $R$ represents the radius of the uniform circular array, $\theta_i$ represents an azimuth angle of the $i^{th}$ antenna, and $\lambda$ represents the wavelength of the electromagnetic wave emitted from the base station.

14. The method according to claim 13, wherein a codebook $C_r$ of rank r among the $N_t$ codebooks is determined in the formula of:

$$C_r = \{W_r^{(mN+n)}, m=0,1,\ldots,M-1; n=0,1,\ldots,N-1\},$$

wherein $W_r^{(mN+n)} = X_{m,n}(:,1:r)/\sqrt{r}$, $1 \leq r \leq N_t$, $X_{m,n}$ represents a $N_t \times N_t$ matrix, $X_{m,n}(:,1:r)$ represents a matrix composed of the first to $r^{th}$ column vectors of the matrix $X_{m,n}$, and $X_{m,n}$ is constructed by the equation of:

$$X_{m,n}(:,k) = \text{diag}(D(:,k)) * v_{m,n}, \, k=1,2,\ldots,N_t,$$

wherein $D$ represents the $N_t \times N_t$ Hadamard matrix with the first column which is all 1 or all −1, $X_{m,n}(:,k)$ represents the $k^{th}$ column vector of the matrix $X_{m,n}$, $D(:,k)$ represents the $k^{th}$ column vector of the matrix $D$, and $\text{diag}(D(:,k))$ represents a diagonal matrix with main diagonal elements being the $k^{th}$ column vector of the matrix $D$.

15. The device according to claim 13, wherein the codeword index information comprises rank indication information and codeword indication information.

* * * * *